(12) United States Patent
Hasegawa et al.

(10) Patent No.: US 6,622,689 B2
(45) Date of Patent: Sep. 23, 2003

(54) METHOD AND SYSTEM FOR CONTROLLING AUTO-IGNITION IN AN INTERNAL COMBUSTION ENGINE

(75) Inventors: Kazuya Hasegawa, Tokyo (JP); Koji Hiraya, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/150,157

(22) Filed: May 20, 2002

(65) Prior Publication Data

US 2002/0195078 A1 Dec. 26, 2002

(30) Foreign Application Priority Data

Jun. 25, 2001 (JP) .................................. 2001-191130

(51) Int. Cl.[7] .............................. F01L 1/34; F02B 3/08
(52) U.S. Cl. ........................... 123/294; 123/90.15
(58) Field of Search ........................... 123/90.15, 90.16, 123/90.17, 90.18, 294, 295

(56) References Cited

U.S. PATENT DOCUMENTS

| | | | |
|---|---|---|---|
| 4,397,270 A | 8/1983 | Aoyama | |
| 5,626,109 A | * 5/1997 | Yasumura et al. | ........ 123/90.15 |
| 5,785,016 A | 7/1998 | Enderle et al. | |
| 6,234,123 B1 | * 5/2001 | Iiyama et al. | ............ 123/90.15 |
| 6,336,436 B1 | * 1/2002 | Miyakubo et al. | .......... 123/295 |
| 6,386,177 B2 | 5/2002 | Urushihara et al. | |
| 6,422,200 B1 | * 7/2002 | Morikawa et al. | ........ 123/90.13 |
| 2001/0027783 A1 | 10/2001 | Hiraya et al. | |
| 2001/0045201 A1 | 11/2001 | Yoshizawa et al. | |
| 2001/0056322 A1 | 12/2001 | Yoshizawa et al. | |
| 2002/0166536 A1 | * 11/2002 | Hitomi et al. | ............ 123/90.15 |

FOREIGN PATENT DOCUMENTS

| | | |
|---|---|---|
| EP | 1 134 398 A2 | 9/2001 |
| JP | 55-137305 | 10/1980 |
| JP | 8-177434 | 7/1996 |
| JP | 10-266878 | 10/1998 |

* cited by examiner

Primary Examiner—Erick Solis
(74) Attorney, Agent, or Firm—Foley & Lardner

(57) ABSTRACT

A method and system for controlling an auto-ignition in an internal combustion engine, comprises setting the closing timing of an outlet control device of a cylinder increasingly before or ahead a top dead center (TDC) during the exhaust stroke with the decreasing engine loads at the rate of a change in the closing timing per a unit change in the decreasing engine loads. This change in the closing timing increases with the decreasing engine loads. The opening timing of an inlet control device of the cylinder is set after the TDC.

16 Claims, 14 Drawing Sheets

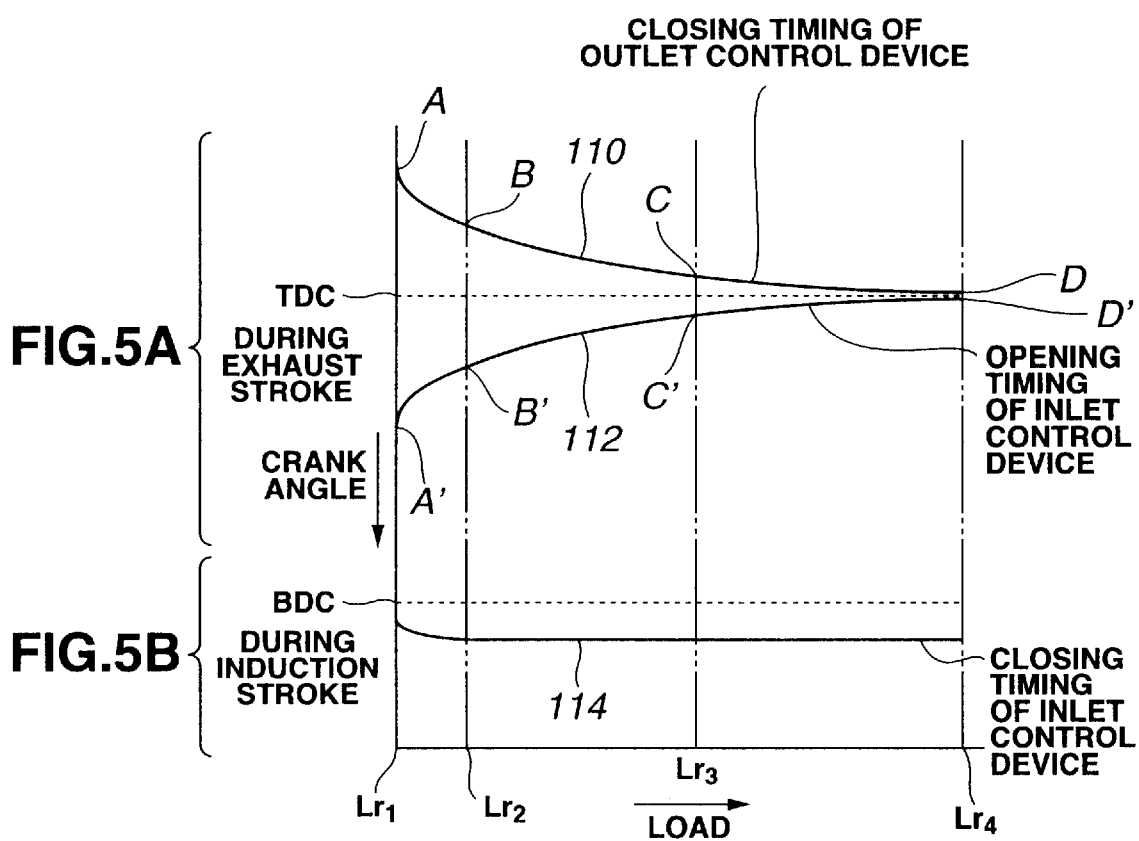

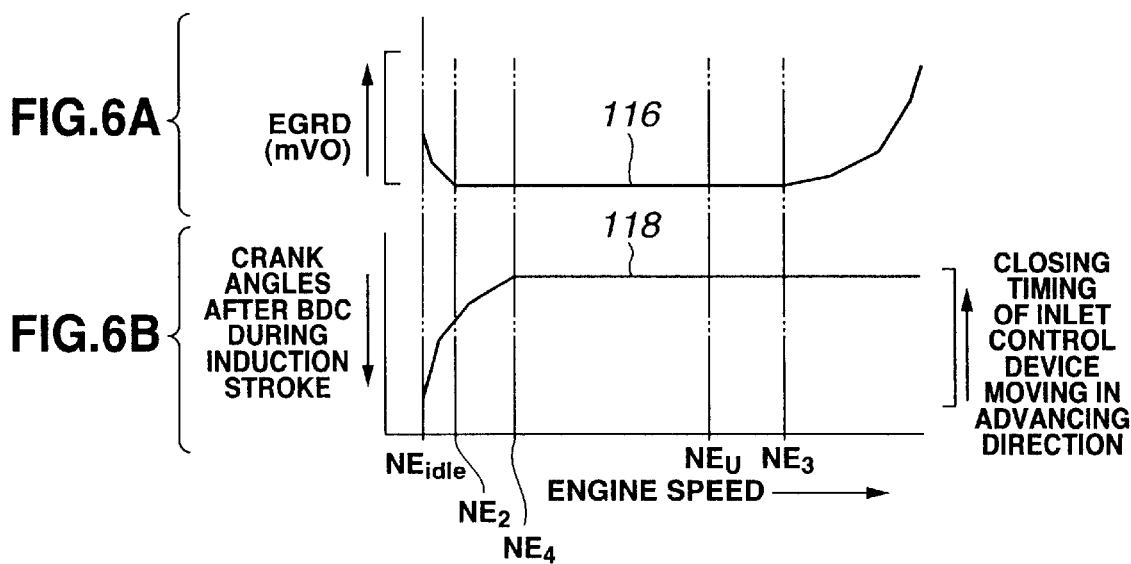
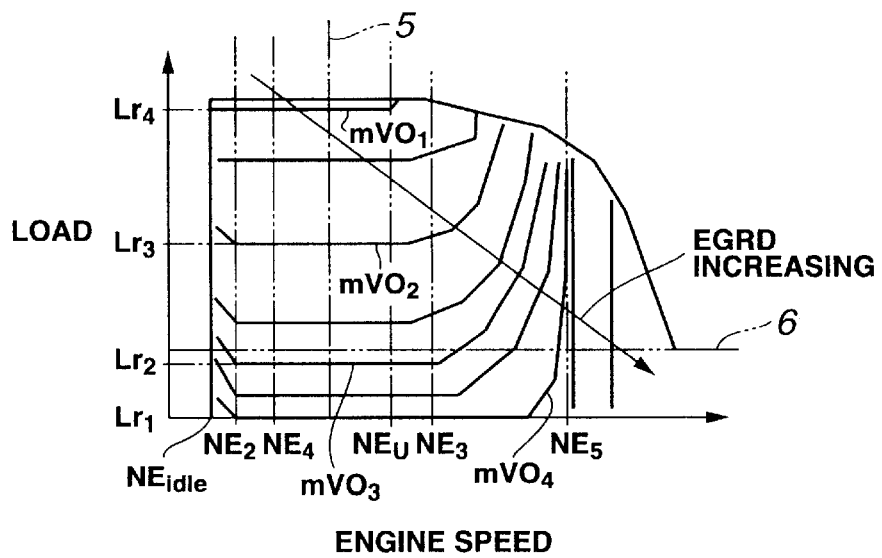

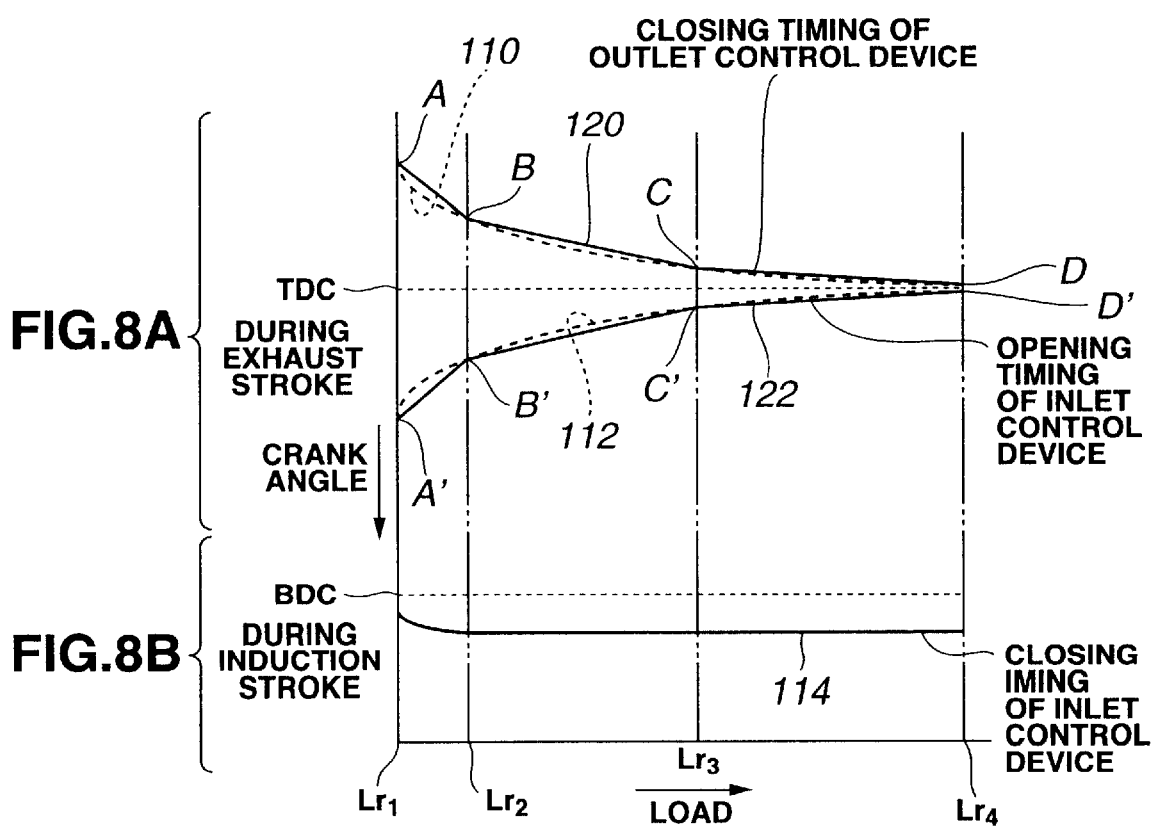

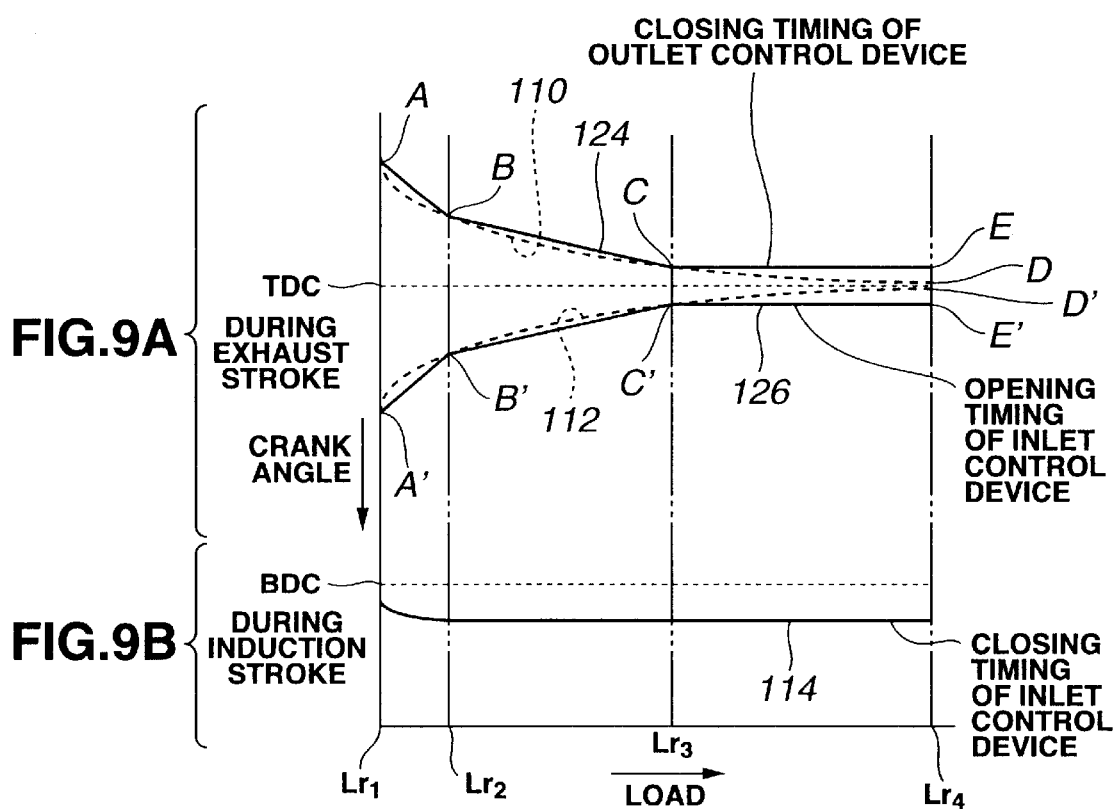

METHOD AND SYSTEM FOR CONTROLLING AUTO-IGNITION IN AN INTERNAL COMBUSTION ENGINE

BACKGROUND OF THE INVENTION

1. Field of the Invention

The present invention relates to a method and system for controlling auto-ignition in an internal combustion engine.

2. Description of the Background Art

JP-A 10-266878 discloses a method of controlling auto-ignition in an internal combustion engine over an engine operating range including a light load region and a middle load region. According to this method, the closing timing of an exhaust valve is set increasingly before a top dead center (TDC) during the exhaust stroke with the decreasing engine loads at the rate of a fixed change in the closing timing per a unit change in the decreasing engine loads. The opening timing of an intake valve is set increasingly after the TDC with the decreasing engine loads at the rate of the fixed change.

This manner of valve timing control is satisfactory over limited range of engine loads to provide thermal energy to sustain cylinder temperature high enough for auto-ignition. However, a need remains to develop valve-timing strategies to provide cylinder temperature high enough for auto-ignition over a wider range of engine loads. At light load region of an engine operating range for auto-ignited combustion, the ignitability of auto-ignition drops and it is found to be difficult to elevate cylinder temperature to a sufficiently high level. This stems from the fact that at light load region, substantial portion of thermal energy of the retained exhaust gas is lost through the cylinder wall so that a gain in thermal energy against a unit increase in exhaust gas retaining duration is small. At heavy load region of such engine operating range for auto-ignited combustion, the ignitability of auto-ignition is enhanced so that it is no longer necessary to retain substantial amount of retained exhaust gas by setting the exhaust gas retaining duration.

SUMMARY OF THE INVENTION

It is an object of the present invention to provide a method and system for controlling auto-ignition in an internal combustion engine to reliably sustain auto-ignition over a wider engine operating range including such light load region where the ignitability of auto-ignition is likely to drop.

According to one aspect of the present invention, there is provided a method for controlling an auto-ignition in an internal combustion engine including a cylinder with an inlet control device and an outlet control device, comprising:

setting the closing timing of the outlet control device increasingly before a top dead center (TDC) during the exhaust stroke of each engine cycle with decreasing engine loads at the rate of a change in the closing timing per a unit change in the decreasing engine loads, which change in the closing timing increases with the decreasing engine loads; and setting the opening timing of the inlet control device after the TDC.

BRIEF DESCRIPTION OF THE DRAWINGS

Further objects and advantages of the invention will be apparent from reading of the following description in conjunction with the accompanying drawings.

FIG. 5A shows the variation of closing timing of outlet control device and opening timing of inlet control device versus different engine loads of engine operating range of different engine loads $Lr_1$–$Lr_4$, which variation is provided if viewing FIG. 7 along a section taken through the line 5.

FIG. 5B shows the variation of closing timing of inlet control device versus different engine loads of the same engine operating range.

FIG. 6A shows the variation of EGRD (mVO) versus different engine speeds, which variation has been provided if viewing FIG. 7 along a section taken through the line 6.

FIG. 6B shows the variation of closing timing of inlet control device versus different engine speeds.

FIG. 7 is an EGRD map showing the variation of EGRD versus engine load and engine speed.

FIG. 8A is a modification of FIG. 5A.

FIG. 8B shows the variation corresponding to FIG. 5B.

FIG. 9A is a modification of FIG. 5A.

FIG. 9B shows the variation corresponding to FIG. 5B.

DETAILED DESCRIPTION OF THE INVENTION

Figure 1:
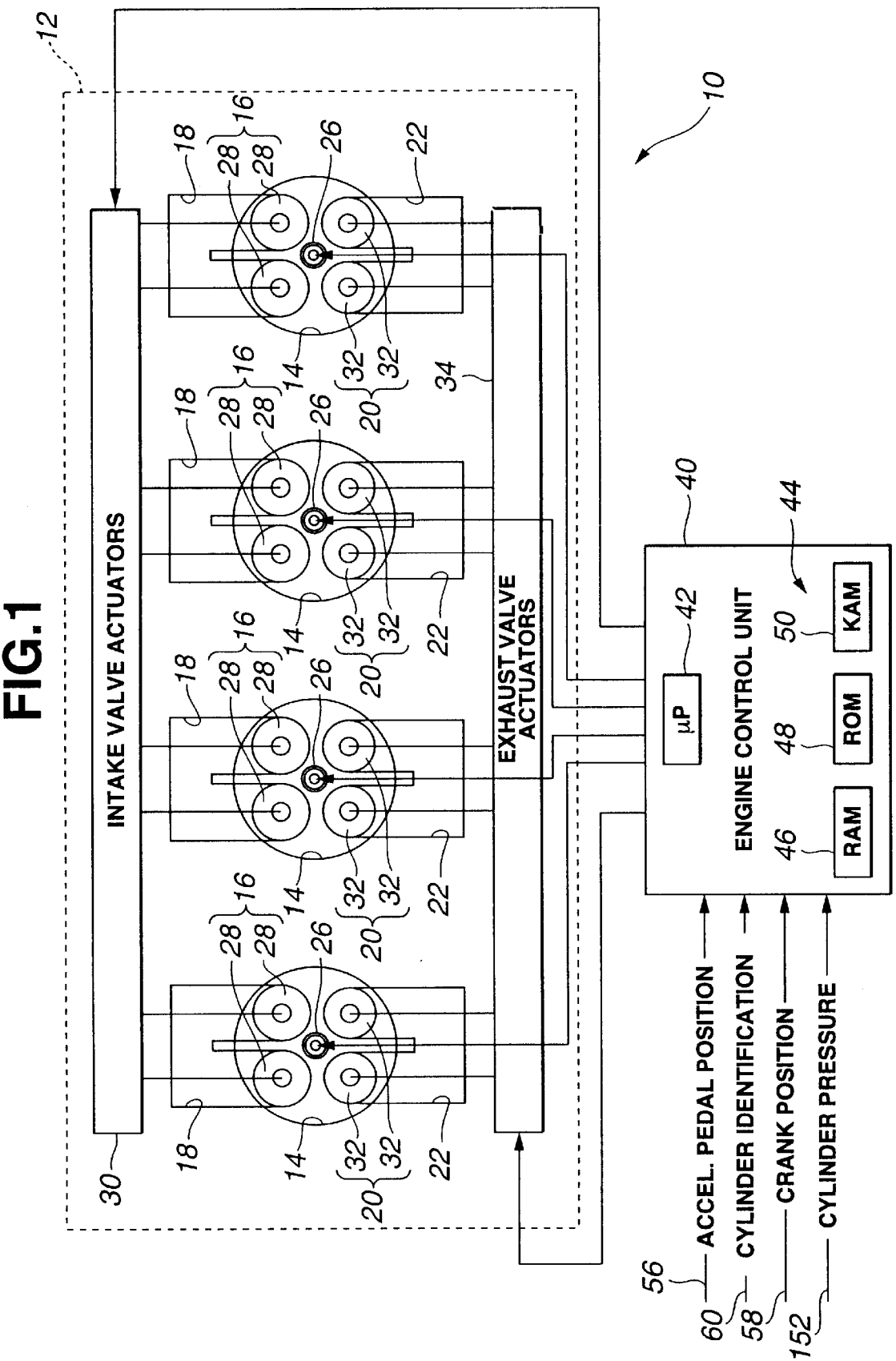
FIG. 1 is a schematic diagram of a multi-cylinder internal combustion engine.
Figure 2:
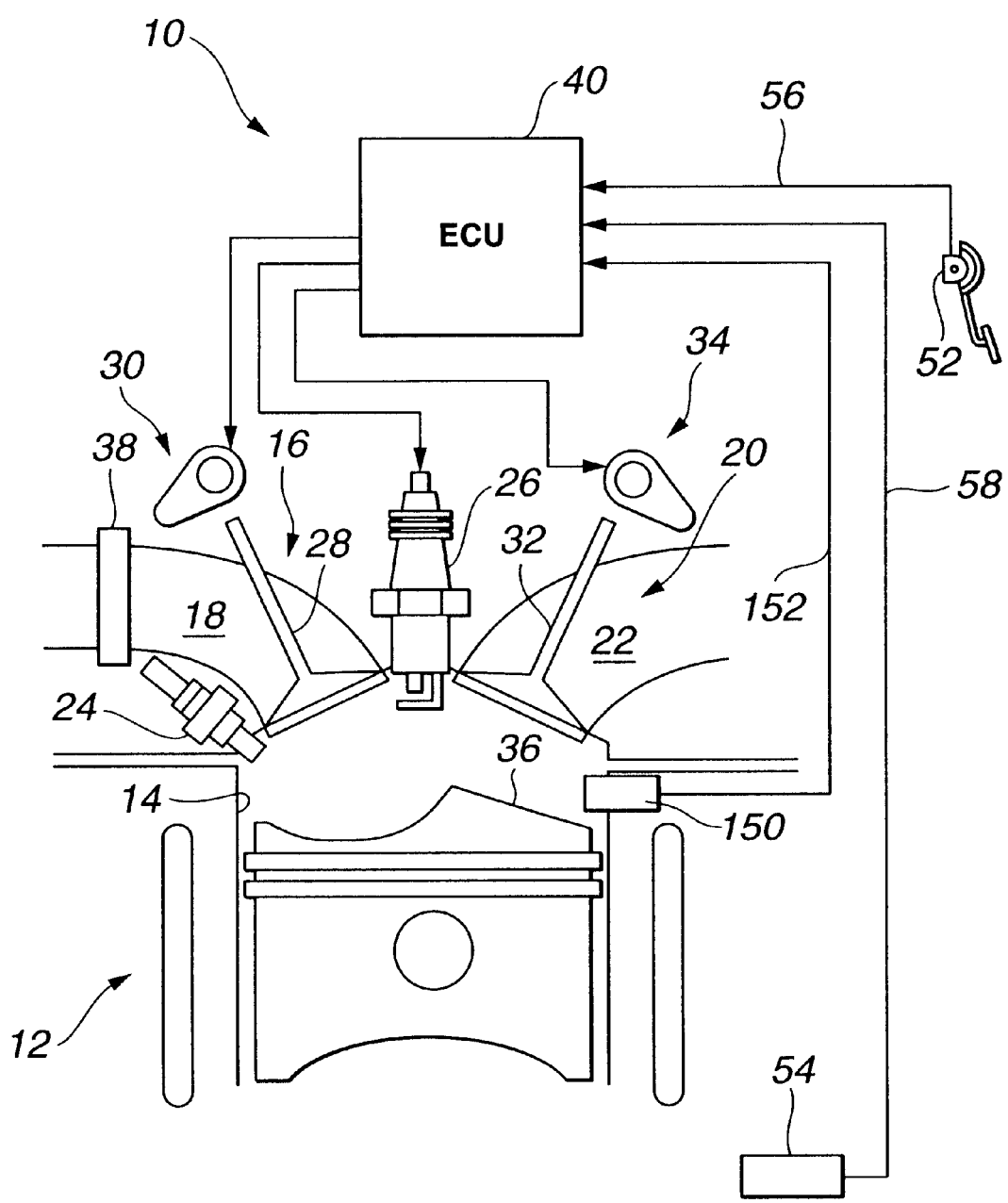
FIG. 2 is a schematic diagram, showing a single cylinder of the engine shown in FIG. 1.

Referring to FIGS. 1 and 2, there is shown an auto-ignition control system 10 which is made and utilized in accordance with the teachings of the exemplary embodiment of the present invention. Particularly, system 10 is adapted for use in an internal combustion engine 12 including several substantially identical cylinders 14. Each cylinder 14 includes an inlet control device 16, which is selectively open to allow at least air to enter the cylinder through intake port 18 and an outlet control device 20, which is selectively open to allow exhaust gas escape from cylinder 14 through exhaust port 22. In the exemplary embodiment, each cylinder 14 includes a fuel injector 24, as illustrated in FIG. 2, positioned to inject fuel directly into the cylinder, and a spark plug 26, which is selectively set in operation when spark is needed. While an engine of the direct fuel injection type is illustrated in FIG. 2, it should be appreciated that system 10 may be used in combination with engines of the port fuel injection type.

Engine 12 further includes a conventional spark controller that is communicably coupled to ignition system to selectively vary the "spark" or ignition timing of each cylinder 14 when spark is needed or to selectively discontinue generation of spark according to a certain or predetermined spark timing strategy. In one exemplary embodiment, spark is needed to provide energy assist, as auto-ignition support, thereby to extend operating range for auto-ignited combustion to include lighter engine loads. During engine operation range at high speeds and/or full load, spark-ignited combustion is carried out.

In exemplary embodiments, inlet control device 16 of each cylinder 14 includes at least one intake valve 28, and outlet control device 20 of each cylinder 14 includes at least one exhaust valve 32. Intake and exhaust valve actuators 30 and 34 actuate inlet and outlet control devices 16 and 20.

As shown in FIG. 2, a conventional piston 36 is slidably disposed within each cylinder 14. FIG. 2 also shows an airflow sensor 38 positioned upstream of intake ports 18 with respect to intake airflow to intake ports 18. Although not shown, intake ports 18 communicate, in a conventional manner, with an intake manifold, not illustrated, and exhaust ports 22 communicate, in a conventional manner, with an exhaust manifold. While, a four-stroke cycle internal combustion engine having four cylinders is illustrated in FIG. 1, it should be appreciated that the present system 10 may be used in combination with other types of engines having different numbers of cylinders and/or valves.

In the exemplary embodiment, intake and exhaust valve actuators 30 and 34 are conventional cam actuators. Various examples of such cam actuators are known. One example is shown in JP-A 8-177434 published Jul. 9, 1996. According to this example, a low lift cam or a high lift cam is selectively used to alter valve lift and timing, and besides the rotational phase of a camshaft relative to the engine crankshaft is adjusted to alter valve timing. Another example is shown in JP-A 55-137305 published Oct. 27, 1980, which corresponds to U.S. Pat. No. 4,397,270 issued Aug. 9, 1983 to Aoyama. According to this example, the angular position of an eccentric shaft of a rocker arm is adjusted to alter valve lift and timing. In one alternate embodiment, intake and exhaust valve actuators 30 and 34 comprise an electromagnetic actuator that is utilized for each of intake and exhaust valves 28 and 32. An example of such an electromagnetic actuator is shown in U.S. Pat. No. 5,785,016 issued Jul. 28, 1998 to Enderle et al. In this case, each of intake and exhaust valves 28 and 32 may be selectively and independently controlled.

In the exemplary embodiment, auto-ignition control system 10 includes a valve controller. The valve controller is electrically and communicably coupled to intake and exhaust valve actuators 30 and 34. As discussed more fully and completely below, the valve controller determines which control devices 16 and 20 are to be actuated, when the respective control devices 16 and 20 are to be actuated, opening and closing timings at which the respective control devices 16 and 20 are to be opened and closed, and the duration or period of time for which the respective control devices 16 and 20 are to be actuated according to a certain or predetermined valve timing strategy.

In the exemplary embodiment, the valve controller comprises a portion of a conventional engine control unit (ECU) 40. In another exemplary embodiment, the valve controller is a conventional controller including one or more microprocessors. The valve controller may comprise a disparate chip, device or module externally coupled to ECU 40.

ECU 40 includes a microprocessor generally represented by reference numeral 42. The microprocessor 42 communicates with the associated computer-readable storage media 44. As will be appreciable by one of ordinary skill in the art, computer-readable storage media 44 may include various devices for storing data representing instructions executable by microprocessor 42 to control the engine. For example, computer-readable storage media 44 may include a random access memory (RAM) 46, a read-only memory (ROM) 48, and/or a keep-alive memory (KAM) 50. These functions may be carried out through any one of a number of known physical devices including EPROM, EEPROM, flash memory, and the like. ECU 40 also includes appropriate electronic circuitry, integrated circuits, and the like to carry out control of the engine. As such, ECU 40 is used to carry out control logic implemented in terms of software (instructions) and or hardware components. Details of control logic implemented by ECU 40 are readily derivable as the discussion proceeds.

In the exemplary embodiment, ECU 40 receives various signals from sensors, switches, and other input devices to monitor current operating conditions of the vehicle. For example, sensors may include an accelerator sensor 52 and a crank position sensor 54, and signals may include an accelerator pedal position signal 56, a crank position signal 58 and a cylinder identification signal 60. As will be appreciable by one of ordinary skill in the art, ECU 40 determines engine speed Ne and engine load Lr based on such signals. For example, crank position signal may be used to determine engine speed Ne, and accelerator pedal position may be used to determine engine load Lr.

Engine 12 further includes a conventional fuel injection controller that is communicably coupled to fuel injection system to determine the base quantity of fuel to be delivered according to load Lr, and the pulse width. The fuel injection controller determines which injection mode is to be selected out of a group of injection modes including a multiple injection mode and a normal injection mode, and the timing of fuel injection according to a certain or predetermined injection timing strategy.

In the exemplary embodiment, the spark controller, valve controller and fuel injection controller comprise portions of ECU 40. ECU 40 includes one or more stored spark timing strategies, one or more stored fuel timing strategies and one or more valve timing strategies to selectively accomplish auto-ignited combustion or spark-ignited combustion.

Various examples of such strategies to accomplish auto-ignited combustion of gasoline fuel have been proposed in U.S. patent application Ser. No. 09/767,025 filed Jan. 23, 2001 by Urushihara et al., U.S. Patent Application Pub. No. US2001/0045201 A1 (Yoshizawa et al.) published Nov. 29, 2001, U.S. Patent Application Pub. No. US2001/0027783 A1 (Hiraya et al.) published Oct. 11, 2001, and U.S. Patent Application Pub. No. US 2001/0056322 A1 (Yoshizawa et al.) published Dec. 27, 2001, each of which has been commonly assigned herewith and hereby incorporated by reference in its entirety. The above-mentioned U.S. patent application Ser. No. 09/767,025 corresponds to EP 1 134 398 A2 published Sep. 19, 2001.

In operation, during an engine operating range of different engine loads in auto-ignited combustion mode, the exhaust gas retaining duration (EGRD) is provided to trap a portion of exhaust gas at around top dead center (TDC) during the exhaust stroke of each engine cycle to keep cylinder temperature high enough for sustaining auto-ignition of fresh charge at around TDC during the compression stroke of the subsequent engine cycle. During an engine operating range in spark-ignited combustion mode, the overlap where both inlet and outlet control devices 16 and 20 are open is provided to eliminate such EGRD.

In the exemplary embodiment, during engine operating range in auto-ignited combustion mode, the valve controller adjusts the opening and closing timings of inlet and outlet control devices 16 and 20 such that piston 36 reciprocates within cylinder 14 to perform exhaust phase, exhaust gas retaining phase, induction phase, compression phase, and expansion phase. During engine operating range in spark-ignited combustion mode, the valve controller adjusts the opening and closing timings of inlet and outlet control devices 16 and 20 such that piston 36 reciprocates within cylinder 14 to perform exhaust phase, induction phase, compression phase, and expansion phase.

Figure 3:
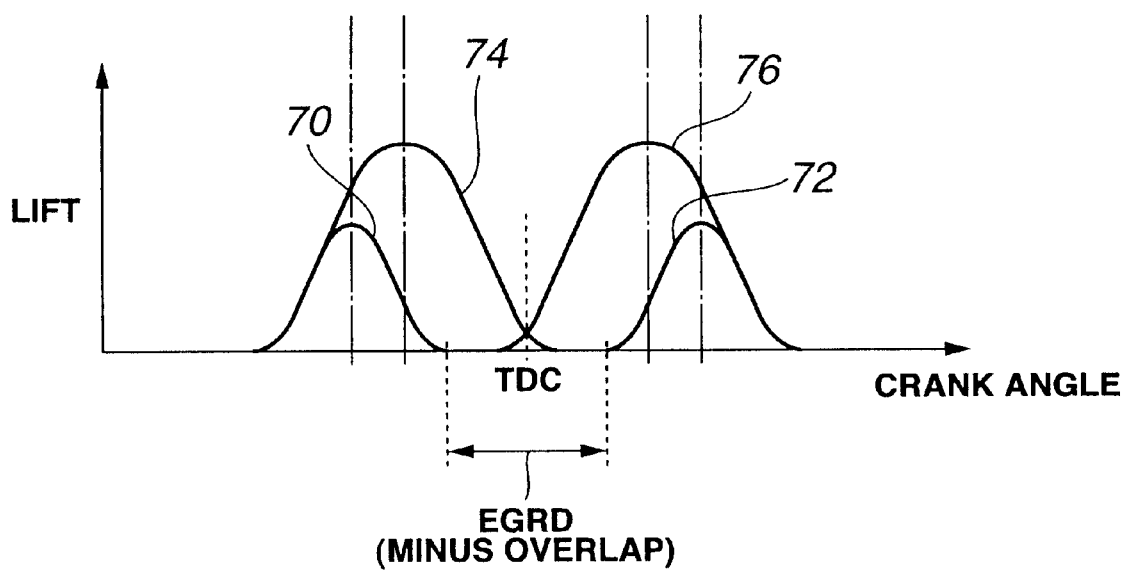
FIG. 3 is a valve lift diagram of a minus overlap, which represents an exhaust gas retaining duration (EGRD), between the closing timing of an outlet control device and the opening timing of an inlet control device as well as a plus overlap between them.

FIG. 3 shows one example of valve lift diagrams 70 and 72 of outlet and inlet control devices 20 and 16 to be set during engine operating range in auto-ignited combustion mode. It also shows one example of valve lift diagrams 74 and 76 of outlet and inlet control devices 20 and 16 to be set during engine operating range in spark-ignited combustion mode. These examples clearly show minus overlap over TDC during the exhaust stroke for EGRD in auto-ignited combustion mode as compared to plus overlap in spark-ignited combustion mode. One-dot chain vertical lines pass through the crests of lift diagrams 70, 72, 74 and 76, respectively, illustrating a crank angle at which each of the outlet and inlet control devices 20 and 16 takes the maximum lift in one of the lift diagrams.

With continuing reference to FIG. 3, outlet control device 20 is allowed to close before TDC during the exhaust stroke of each engine cycle, so that a fraction of high temperature exhaust gas is retained and compressed during the last travel section of the piston exhaust stroke. Inlet control device 16 is allowed to open during the induction stroke of the subsequent engine cycle after the TDC. The setting of the opening timing is such that inlet control device 16 is allowed to open after almost all of work done by piston 36 to compress the retained exhaust gas has been transferred to energy to move piston 36 in a downward direction from the TDC. The thermal energy of the exhaust gas retained and compressed due to the minus overlap over the TDC during the exhaust stroke of each engine cycle causes an elevation in cylinder temperature. The cylinder temperature elevation provides advantageous influence on auto-ignition at around TDC during the compression stroke of the subsequent engine cycle. In the exemplary embodiment, during engine operating range in auto-ignited combustion mode, the valve controller varies EGRD by keeping the closing timing of outlet control device 20 and the opening timing of inlet control device 16 equiangularly separated before and after TDC during the exhaust stroke, respectively.

With the same engine speed and engine load, the earlier the closing timing of outlet control device 20 is, the more the volume of retained exhaust gas is. The more the volume of retained exhaust gas is, the more the thermal energy transferred to the subsequent engine cycle is. In other words, EGRD determines the amount of thermal energy transferred to the subsequent engine cycle, which in turn determines the cylinder temperature Ttdc at around TDC during the compression stroke.

Figure 4:
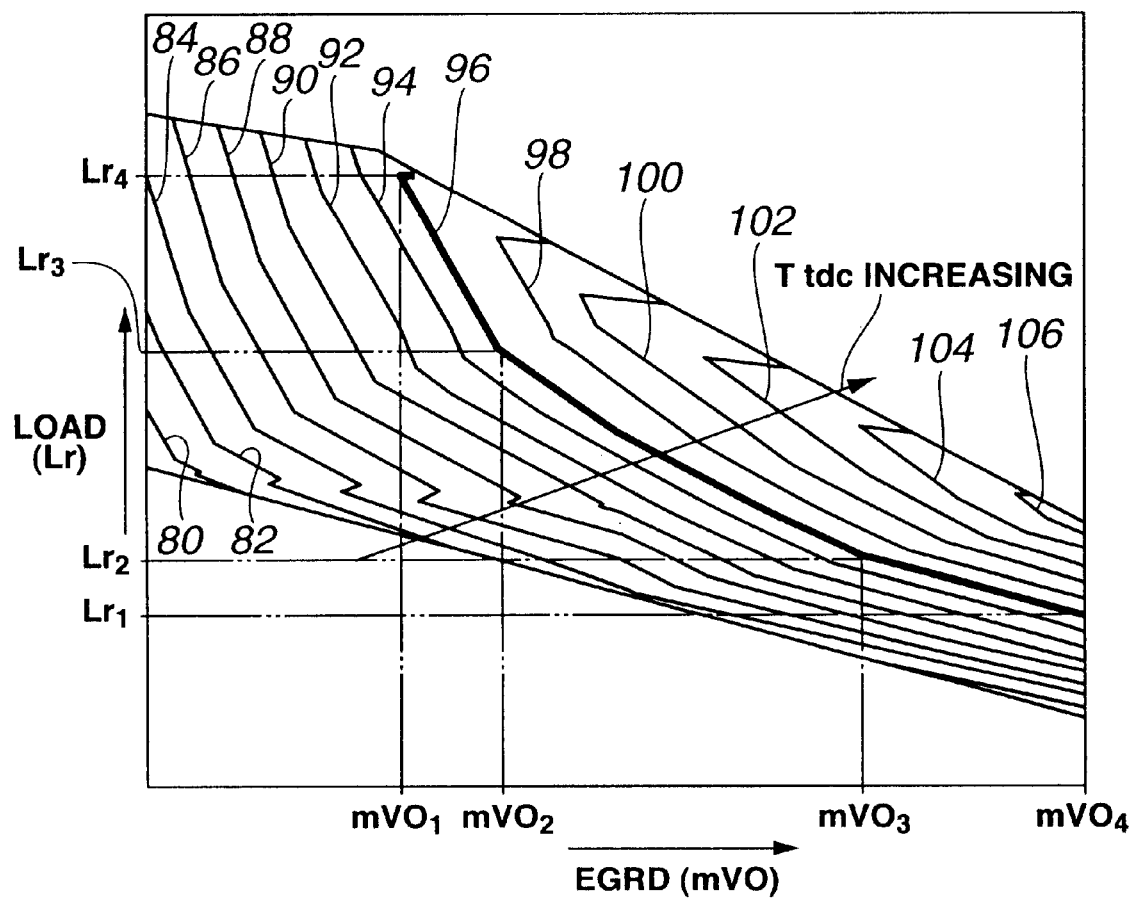
FIG. 4 is a graph of isothermal curves, each interconnecting equal cylinder temperature at around TDC during the compression stroke versus different engine loads and different EGRDs.

FIG. 4 shows isothermal lines, each interconnecting equal cylinder temperature Ttdc at around TDC of the compression stroke versus different engine loads Lr and EGRDs. In FIG. 4, the vertical axis represents engine load Lr, which may be expressed in terms of the pulse width indicative of the base quantity of fuel. The fuel injection controller determines the base quantity of fuel. The horizontal axis represents the EGRD expressed in terms of minus valve overlap (mVO). The minus valve overlap ranges from the closing timing of outlet control device 20 to the opening timing of inlet control device 16. In the exemplary embodiment, mVO is used as a parameter indicative of EGRD because the crank angles by which the opening timing of inlet control device 16 is set increasingly or delayed after the TDC correspond to the crank angles by which the closing timing of outlet control device 20 is set increasingly or advanced before the TDC.

In FIG. 4, isothermal lines clearly indicate that, with the same engine load, an increase in EGRD (mVO) causes an increase in cylinder temperature Ttdc owing to an increase in volume of retained exhaust gas. The number of isothermal lines passing through a unit increase in EGRD (mVO), with the same engine load, indicates an increase in cylinder temperature Ttdc per such unit increase in EGRD(mVO). The longer EGRD(mVO) is, the smaller the number of isothermal curves passing through the unit increase in EGRD (mVO) is. In other words, an increase in cylinder temperature Ttdc per unit increase in EGRD (mVO) is small when EGRD (mVO) is long, while it is large when EGRD (mVO) is short. This tendency occurs because the thermal loss increases as EGRD (mVO) increases.

From the preceding description, it will be appreciated that EGRD and engine load Lr determine cylinder temperature Ttdc. Decreasing engine load Lr causes a drop in cylinder temperature Ttdc.

In FIG. 4, fourteen (14) isothermal lines are indicated by the reference numerals. Values in cylinder temperature Ttdc represented by isothermal lines 80, 82, 84, 86, 88, 90, 92 and 94 are not high enough to cause auto-ignition at around TDC during the compression stroke. Values in cylinder temperature Ttdc represented by isothermal lines 98, 100, 102, 104 and 106 are so high that auto-ignition may take place before the piston reaches the TDC. It is confirmed that cylinder temperature Ttdc needs to be elevated as high as 1000° K to provide reliable auto-ignition. Accounting for them, a desired value in cylinder temperature Ttdc is determined, which is high enough to cause auto-ignition at around the TDC during the compression stroke. Such desired value is represented by an isothermal curve (illustrated by the bold line) 96.

In the exemplary embodiment, the isothermal line 96 interconnects desired values in EGRD versus different values in engine load Lr to accomplish the above-mentioned desired value in cylinder temperature Ttdc over an engine operating range of different engine loads from $Lr_1$ to $Lr_4$. Isothermal line 96 may be divided into three sections, namely, first, second and third sections. The first section, which extends between a first Cartesian point ($mVO_4$, $Lr_1$) and a second Cartesian point ($mVO_3$, $Lr_2$), represents desired values in EGRD for a light load region from $Lr_1$ to $Lr_2$ of the engine operating range. The second section, which extends between the second Cartesian point ($mVO_3$, $Lr_2$) and a third Cartesian point ($mVO_2$, $Lr_3$), represents desired values in EGRD for an intermediate load region from $Lr_2$ to $Lr_3$ of the engine operating range. The third section, which extends between the third Cartesian point ($mVO_2$, $Lr_3$) and a fourth Cartesian point ($mVO_1$, $Lr_4$), represents desired values in EGRD for a heavy load region from $Lr_3$ to $Lr_4$ of the engine operating range. In FIG. 4, the relationships are $Lr_1 < Lr_2 < Lr_3 < Lr_4$ and $mVO_1 < mVO_2 < mVO_3 < mVO_4$.

In each of the light, intermediate, and heavy load regions, a unit change in engine load Lr requires a change in EGRD to closely follow the isothermal line 96. The required change in EGRD per the unit change in engine load Lr, however, is not common in each of the different load regions. The required change in EGRD for the light load region is greater than the required change in EGRD for the intermediate load region, and the required change in EGRD for the intermediate load region is greater than the required change in EGRD for the heavy load region.

With continuing reference to FIG. 4, isothermal line 96 represents the desired relationship by interconnecting desired values in EGRD (mVO) versus different values in engine load Lr. As will be readily seen from an EGRD map in FIG. 7, this relationship between EGRD (mVO) and Lr remains unaltered over a certain range of different engine speeds from a range lower limit $NE_2$ to a range upper limit $NE_u$ ($NE_2 < NE_u$). The EGRD map shown in FIG. 7 is used to determine desired values in EGRD (mVO) versus different values in engine load Lr and different values in engine speed NE. In FIG. 7, the vertical line represents engine load Lr, and the horizontal line represents engine speed NE. On the horizontal line in FIG. 7, the reference character $NE_{idle}$ is the engine idle speed, and the relationship is $NE_{idle} < NE_2 < NE_4 < NE_u < NE_3 < NE_5$.

With reference now to FIGS. 5A, 5B, 6A, 6B and 7, the valve timing strategy to accomplish the desired value in cylinder temperature Ttdc as represented, for example, by isothermal line 96 in FIG. 4 will be described below.

FIG. 5A shows the variation of closing timing of outlet control device 20 and opening timing of inlet control device 16 versus different engine loads of the engine operating range. The variation has been provided if viewing the EGRD map along a section taken through the line 5 in FIG. 7. As mentioned before, the engine operating range includes three different regions. In the exemplary embodiment, there are light load region $Lr_1–Lr_2$, intermediate load region $Lr_2–Lr_3$ and heavy load region $Lr_3–Lr_4$. In FIG. 5A, the illustrated line 110 interconnects desired crank positions of the closing timing of outlet control device 20 versus different values in engine load Lr. The illustrated line 112 interconnects desired crank positions of the opening timing of inlet control device 16 versus different values in engine load Lr. The distance between a point on line 110 and a point on line 112, which lie on an imaginary vertical straight line passing though a point on the horizontal line, indicates a desired value, in terms of crank angles, of EGRD (mVO) against a value in engine load Lr indicated by the point on the horizontal line. For example, firstly, the distance between points A and A' indicates a desired value $mVO_4$ (see FIG. 4) of EGRD against an engine load value $Lr_1$. Secondly, the distance between points B and B' indicates a desired value $mVO_3$ of EGRD against an engine load value $Lr_2$. Thirdly, the distance between points C and C' indicates a desired value $mVO_2$ of EGRD against an engine load value $Lr_3$. Lastly, the distance between points D and D' indicates a desired value $mVO_1$ of EGRD against an engine load value $Lr_4$.

In the exemplary embodiment, accounting for the line 110, the valve controller sets the closing timing of outlet control device 20 before TDC during the exhaust stroke of each engine cycle. The valve controller sets the opening timing of inlet control device 16 after the TDC. As clearly seen from the line 110 in FIG. 5A in association with the isothermal line 96 in FIG. 4, the valve controller sets the closing timing of outlet control device 20 increasingly before the TDC with decreasing engine loads from $Lr_4$ toward $Lr_1$ at the rate of a change in the closing timing per a unit change in the decreasing engine loads. The valve controller increases the change in the closing timing as a function, as illustrated by the line 110, of the decreasing engine loads. The function is such that the lighter the engine load Lr is, the greater the change in the closing timing per the unit change in the engine load is.

As mentioned before, the valve controller keeps the closing timing of outlet control device 20 and the opening timing of inlet control device 16 equiangularly separated before and after TDC during the exhaust stroke, respectively. In particular, the valve controller sets the opening timing of inlet control device 16 increasingly after the TDC with the decreasing engine loads from $Lr_4$ toward $Lr_1$ at the rate of a change in the opening trimming per a unit change in the decreasing engine loads. This change in the opening timing increases as a function, as illustrated by the line 112, of the decreasing engine loads.

The illustrated line 114 of FIG. 5B shows the variation of closing timing of inlet control device 16. The valve controller sets the closing timing of inlet control device 16 after the bottom dead center (BDC) during the induction stroke. The valve controller keeps the closing timing of inlet control device 16 after the BDC) unaltered over heavy and intermediate load regions $Lr_4$ to $Lr_2$ of the engine operating range thereby to maintain a compression ratio within cylinder 14 irrespective of the variation of engine loads. In a manner as illustrated by line 114, the valve controller sets the closing timing of inlet control device 16 decreasingly after the BDC with the decreasing engine loads in light load region $Lr_1–Lr_2$ of the engine operating range.

With reference to FIG. 6A, the illustrated line 116 shows the variation in EGRD (mVO) versus different engine speeds, which variation has been provided if viewing the EGRD map along a section taken through the line 6 in FIG. 7. Line 116 clearly indicates that there is a range of engine speeds, which includes at least a range from $NE_2$ to $NE_u$, over which EGRD appropriate for engine load is unaltered if the engine load remains the same.

With reference to FIG. 6B, the illustrated line 118 shows the variation of closing timing of inlet control device 16 versus different engine speeds. As mentioned before in connection with the illustrated line 114 in FIG. 5B, the valve controller keeps the closing timing of inlet control device 16 unaltered over heavy and intermediate load regions $Lr_4$ to $Lr_2$. The illustrated line 118 in FIG. 6B clearly indicates that the closing timing of inlet control device 16 is kept unaltered over a range of different engine speeds not lower than a predetermined engine speed value $NE_4$. Accordingly, in the exemplary embodiment, the valve controller keeps on setting the closing timing of inlet control device 16 at the appropriate crank position after the BDC to maintain the appropriate compression ratio during engine operation range of different engine speeds not lower than $NE_4$ and of different engine loads not lighter than $Lr_2$.

At low engine speeds lower than $NE_4$, there occur noticeable variations in engine speed. In order to suppress such engine speed variation at low engine speeds, the compression ratio is decreased. Specifically, the compression ratio is decreased during engine operating range of different engine speeds, including an engine idle speed $NE_{idle}$, lower than $NE_4$. In the exemplary embodiment, in order to decrease the compression ratio, the valve controller sets the closing timing of inlet control device 16 increasingly after the BDC with the decreasing engine speeds that are lower than $NE_4$. Such decrease in compression ratio brings about a drop in the ignitability of auto-ignition. If engine speed is lower than a second predetermined engine speed value $NE_2$, a need arises to increase EGRD to compensate for such drop in the ignitability. Accordingly, in the exemplary embodiment, the rotational variation at low engine speeds is suppressed by setting the closing timing of inlet control device 16 increasingly after the BDC as shown by line 118 with the decreasing engine speeds as well as increasing EGRD with the decreasing engine speed if the engine speed is lower than $NE_2$. In another exemplary embodiment, to suppress the rotational variations at low engine speeds, a throttle valve, not shown, is used to throttle intake airflow. In this case, too, EGRD is increased as shown by line 116 with the decreasing engine speeds at engine speeds lower than $NE_2$.

At high engine speeds higher than a third predetermined engine speed value $NE_3$, the ignitability of auto-ignition appreciably drops due mainly to shortened period of time for compression. To compensate for such drop, the EGRD is increased with the increasing engine speeds irrespective of the magnitude of engine load. This is because increasing the engine load does not work in enhancing the ignitability of auto-ignition. In the exemplary embodiment, during engine operation of different engine speeds higher than $NE_3$, the valve controller sets the closing timing of outlet control device 20 increasingly before the TDC and the opening timing of inlet control device 16 increasingly after the TDC with the increasing engine speeds, thereby to increase EGRD as shown by line 116 in FIG. 6A.

As described before in connection with FIGS. 5A and 5B, the valve controller increases the change in the closing timing of outlet control device 20 per a unit change in the decreasing engine loads as the function, as illustrated by line 110, of the decreasing engine loads. Besides, the valve controller increases the change in the opening timing of inlet control device 16 per a unit change in the decreasing engine loads as the function, as illustrated by line 112, of the decreasing engine loads. As will be appreciated from the contours of lines 110 and 112, such changes in the closing and opening timings are increased continuously over the three different load regions $Lr_4-Lr_3$, $Lr_3-Lr_2$ and $Lr_2-Lr_1$ of the engine operating range. The illustrated continuous variation of such changes over the whole engine operating range of different engine loads $Lr_4-Lr_1$ is just one of various examples. Another example is shown in FIGS. 8A and 8B. As illustrated by the lines 120 and 122 in FIG. 8A, in this example, the valve controller increases the above-mentioned changes with the decreasing engine loads in a discrete or step manner upon a shift from heavy load region $Lr_4-Lr_3$ to intermediate load region $Lr_3-Lr_2$ and upon a shift from intermediate load region $Lr_3-Lr_2$ to light load region $Lr_2-Lr_1$. During each of such different regions, such changes remain invariable. Other example is shown in FIGS. 9A and 9B. As illustrated by the lines 124 and 146 in FIG. 9A, the valve controller increases the above-mentioned changes with the decreasing engine loads in a discrete or step manner upon a shift from heavy load region $Lr_4-Lr_3$ to intermediate load region $Lr_3-Lr_2$ and upon a shift from intermediate load region $Lr_3-Lr_2$ to light load region $Lr_2-Lr_1$. As different from the previous example, the valve controller keeps the closing timing of outlet control device 20 and the opening timing of inlet control device 16 unaltered during heavy load region $Lr_4-Lr_3$.

With reference to FIGS. 5A, 6A and 7, the illustrated variations of closing timing of outlet control device 20 and opening timing of inlet control device 16 in FIG. 5A provide the contour of one section of EGRD map taken through the line 5 in FIG. 7. FIG. 6A provides the contour of another section of EGRD map taken through the line 6 in FIG. 7.

In the exemplary embodiment, the illustrated EGRD map in FIG. 7 is used. The EGRD map provides various values, for example, $mVO_1$, $mVO_2$, $mVO_3$ and $mVO_4$, of EGRD versus different values of engine speed and load, which values of EGRD if accomplished would create cylinder temperature at least as high as the desired value in cylinder temperature Ttdc as represented, for example by isothermal line 96 in FIG. 4. In the exemplary embodiment, the valve controller sets closing timing of outlet control device 20 and opening timing of inlet control device 16 in a manner to provide various values of EGRD versus different values of engine speed and load as indicated by the EGRD map.

With reference now to FIG. 7, the illustrated EGRD map provides desired values of EGRD for auto-ignited combustion during engine operating range of different engine loads from $Lr_4$ to $Lr_1$. As will be readily understood from iso-EGRD lines in the EGRD map, the EGRD increases with decreasing engine loads at the rate of a change in the EGRD per a unit change in the decreasing engine loads from $Lr_4$ to $Lr_1$. This change in the EGRD increases as a function, as illustrated by lines 110 and 112 in FIG. 5A, of the decreasing engine loads from $Lr_4$ to $Lr_1$. This pattern of variation of EGRD remains unaltered over the certain range of different engine speeds from $NE_2$ to $NE_u$.

If the engine speed exceeds the upper range limit $NE_u$, the EGRD increases with the increasing engine speeds at a rate of a change in EGRD per a unit change in the increasing engine speeds. This magnitude of this change increases with the decreasing engine loads.

If the engine speed further increases and exceeds an engine speed threshold $NE_5$, the EGRD is fixed at one of various maximum levels allowed at different engine speeds irrespective of engine load. This is because, at such high engine speeds as to cause a drop in the ignitability of auto-ignition, it is c/ear that increasing engine load will not alleviate such drop in the ignitability.

If the engine speed drops below $NE_2$, the EGRD increases with the decreasing engine speeds at a rate of a change in EGRD per a unit change in the decreasing engine speeds. The magnitude of this change decreases with the increasing engine loads.

As mentioned before in connection with FIGS. 1 and 2, in the exemplary embodiment, the valve controller comprises a portion of ECU 40. ECU 40 includes microprocessor 42. Microprocessor 42 implements control logic in the form of software instructions that are stored in computer-readable storage media 44 to control internal combustion engine 12.

In the exemplary embodiment, microprocessor 42 executes instructions stored in computer-readable storage media 44 to carry out a method for controlling an auto-ignition in internal combustion engine 12 using the previously described timing strategy to communicate with intake and exhaust valve actuators 30 and 34.

Figure 10:
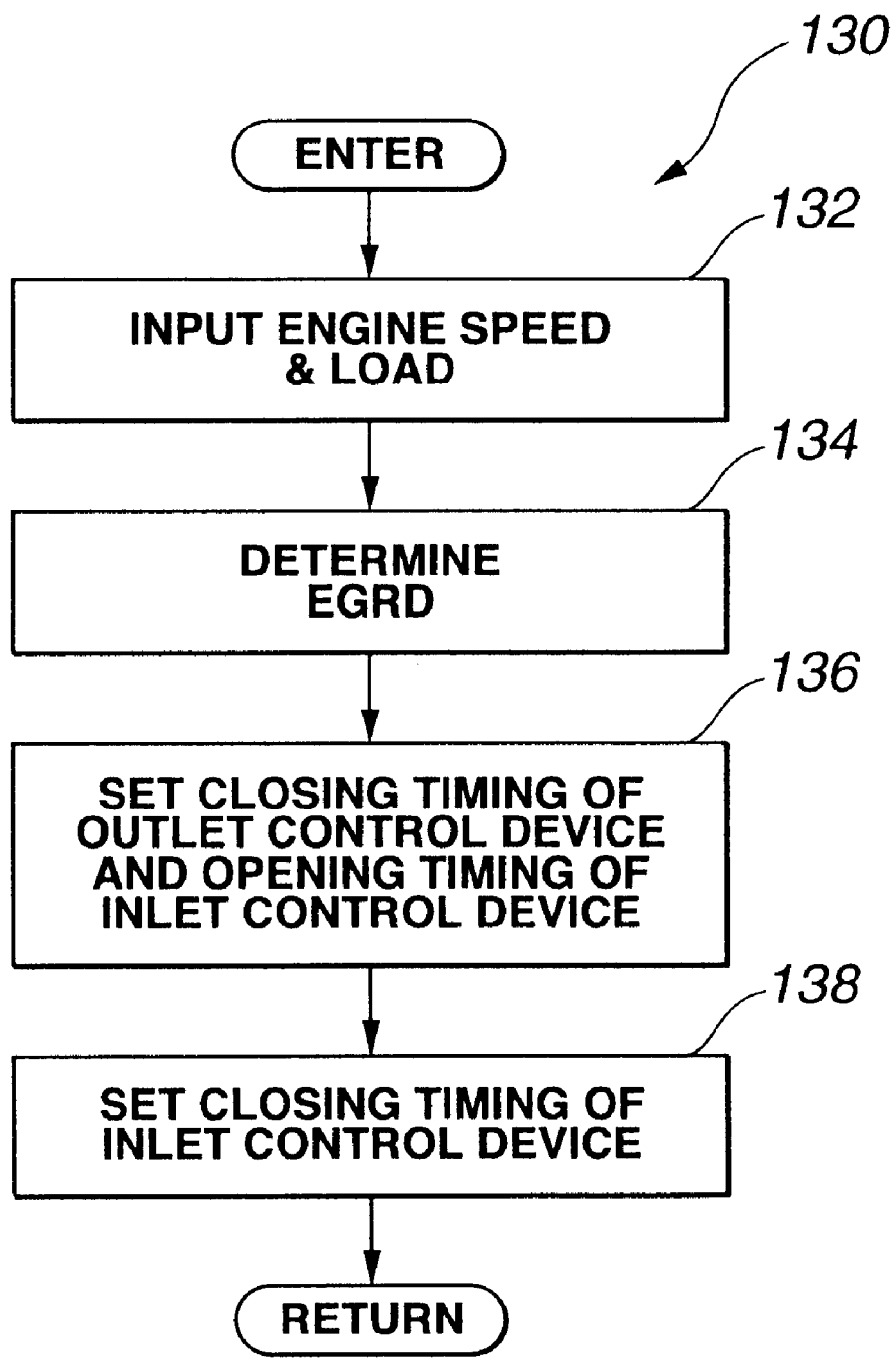
FIG. 10 is a flowchart of a control routine for operating one exemplary implementation of the present invention.

With reference now to FIG. 10, a flowchart 130 illustrates control logic for controlling an auto-ignition in engine 12 by setting closing timing of outlet control device 20, opening timing of inlet control device 16 and closing timing of inlet control device 16. One of ordinary skill in the art will recognize that the control logic may be implemented in software. Likewise various processing strategies may be utilized without departing from the sprint and scope of the present invention. For example, most real-time control strategies utilize interrupt-driven processing. In the exemplary embodiment, microprocessor 42 executes the program illustrated by flowchart 130 at the regular intervals of 10 milliseconds.

In FIG. 130, block 132 represents determination or input of engine speed NE and engine load Lr. Block 134 represents determination of EGRD in terms of mVO versus the engine speed and load NE and Lr, which EGRD accomplishes the previously described relationship with NE and Lr illustrated by EGRD map in FIG. 7.

Various processing manners may be utilized to determine EGRD. One such example includes the step of comparing the determined Lr to lower and upper limits $Lr_1$ and $Lr_4$. If it is determined that Lr falls in between the limits $Lr_1$ and $Lr_4$ or equal to one of these limits, the determined engine speed NE is compared to appropriate one or ones of engine idle speed $NE_{idle}$, the range lower limit $NE_u$ and the threshold $NE_5$. If it is determined that the determined engine speed falls in such range $NE_2$–$NE_u$, a desired value of EGRD is determined versus the determined engine load Lr utilizing a stored function having the characteristic as illustrated by lines 110 and 12 in FIG. 5A or by lines 120 and 122 in FIG. 8A or by lines 124 and 126 in FIG. 9A. If the determined engine speed NE exceeds the range upper limit $NE_u$, a desired value of EGRD is determined versus the determined engine load Lr utilizing the one of stored plural ramp functions selected against the determined engine speed NE, which ramp functions define increasing EGRD with the increasing engine speeds at a rate of a change in EGRD per a unit change in the increasing engine speeds. The magnitude of this change increases with the decreasing engine loads. If the determined engine speed NE exceeds the threshold $NE_5$, a desired value of EGRD is determined against the determined engine speed NE by retrieving one of various maximum levels allowed at different engine speeds irrespective of engine load. If the engine speed drops below $NE_2$, a desired value of EGRD is determined versus the determined engine load Lr by utilizing the one of stored ramp functions against the determined engine speed NE, which ramp functions define increasing EGRD with the decreasing engine speeds at a rate of a change in EGRD per a unit change in the decreasing engine speeds. The magnitude of this change decreases with the increasing engine loads.

If desired, mathematical equations and interpolation may be effectively utilized to approximate the above-mentioned functions.

After having determined the desired value of EGRD at block 134, the logic proceeds to block 136. The block 136 represents setting of closing timing of outlet control device 20 and setting of opening timing of inlet control device 16 in a manner to accomplish the determined desired value of EGRD. In the exemplary embodiment, the desired value mVO of EGRD is divided by two (2) to determine the crank angles by which the closing timing of outlet control device 20 and the opening timing of the inlet control device 16 should be separated angularly from the TDC during the exhaust stroke.

The next block 138 represents setting of closing timing of inlet control device 16 versus the determined engine load Lr and engine speed NE to accomplish the relationship shown by the illustrated lines 114 and 118 in FIGS. 5B and 6B.

It is clear from the operation of flowchart 130 that the closing timing of outlet control device 20 is set increasingly before the TDC during the exhaust stroke with decreasing engine loads at the rate of a change in the closing timing per a unit change in the decreasing engine loads, which change in the closing timing increases as a function of the decreasing engine loads.

It is also clear that the opening timing of inlet control device 16 is set after the TDC by keeping the closing timing of outlet control device 20 and the opening timing of inlet control device 16 equiangularly separated before and after the TDC, respectively.

Further, it is clear that the closing timing of inlet control device 16 is set increasingly after the BDC during the induction stroke with the decreasing engine speeds during engine speed range of different low engine speeds, including engine idle speed $NE_{idle}$, lower than engine speed $NE_4$ thereby to decrease compression ratio to suppress variations in engine speed. Besides, at such low engine speeds, the closing timing of the outlet control device 20 is set increasingly before the TDC with decreasing engine speeds thereby to compensate for deterioration of the ignitability of auto-ignition caused due to such drop in compression ratio.

It will be appreciated from the preceding description that, in the exemplary embodiment, the valve controller sustains auto-ignited combustion during engine operation of different engine loads from $Lr_1$ to $Lr_4$ by maintaining cylinder temperature high enough to cause auto-ignition. With reference back to FIG. 5A, in operation, the valve controller is required to alter closing timing of inlet control device 16 to increase the compression ratio as well as the closing timing of outlet control device 20 during engine operation of different engine loads over $Lr_1$ and $Lr_2$. In other words, the engine load Lr is compared to a predetermined load value that is set equal to $Lr_2$ and the valve controller is required to alter the closing timing of inlet control device 16 in such a direction as to increase compression ratio to provide an auto-ignition support when engine load Lr is lighter or lower than the predetermined load value.

In another exemplary embodiment, valve timing control strategy is simplified by setting the closing timing of inlet control device 16 unaltered. Rather than altering the closing timing of inlet control device 16, the spark controller is set in operation to produce a spark via spark plug 26 to provide an auto-ignition support when engine load Lr is lighter or lower than the predetermined load value.

Figure 11:
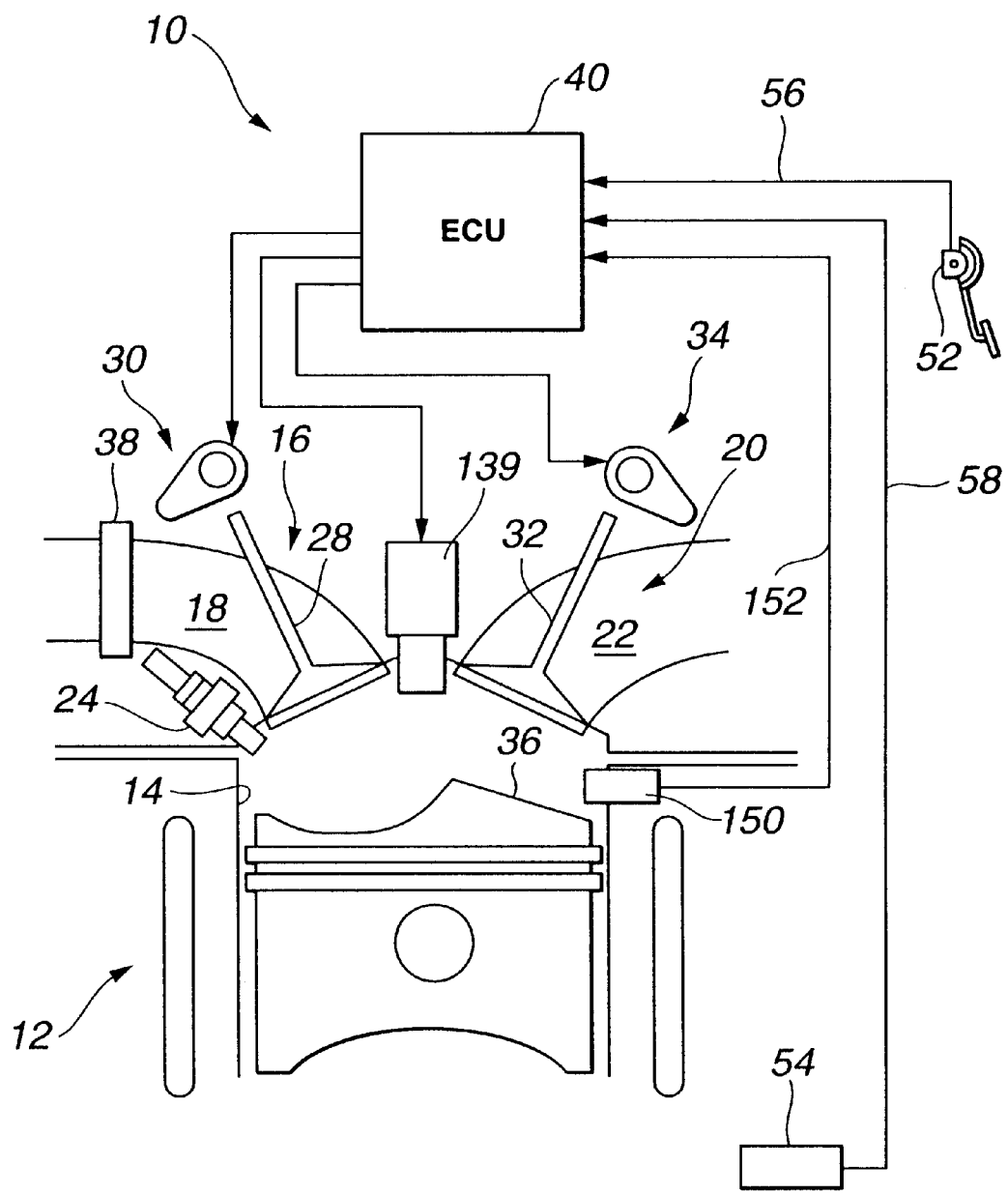
FIG. 11 is a similar view to FIG. 2, showing arrangement of an ozone generator.

In still another exemplary embodiment, an ozone controller is used to produce ozone instead of spark via an ozone generator 139 mounted to communicate with the engine cylinder 14 as shown in FIG. 11 to provide an auto-ignition support when engine load Lr is lighter or lower than the predetermined value. In the exemplary embodiment, the ozone controller comprises a portion of ECU 40.

A need may arise to limit increasing EGRD with the decreasing engine loads. In further exemplary embodiment, the valve controller and spark controller are required to set circumstances for spark-ignited combustion when engine load Lr is lighter or lower than a predetermined load value at which such need arises.

With reference now to FIG. 11, the illustrated engine 10 is substantially the same as that shown in FIG. 2 except the provision of the above-mentioned ozone generator 139.

Figure 12:
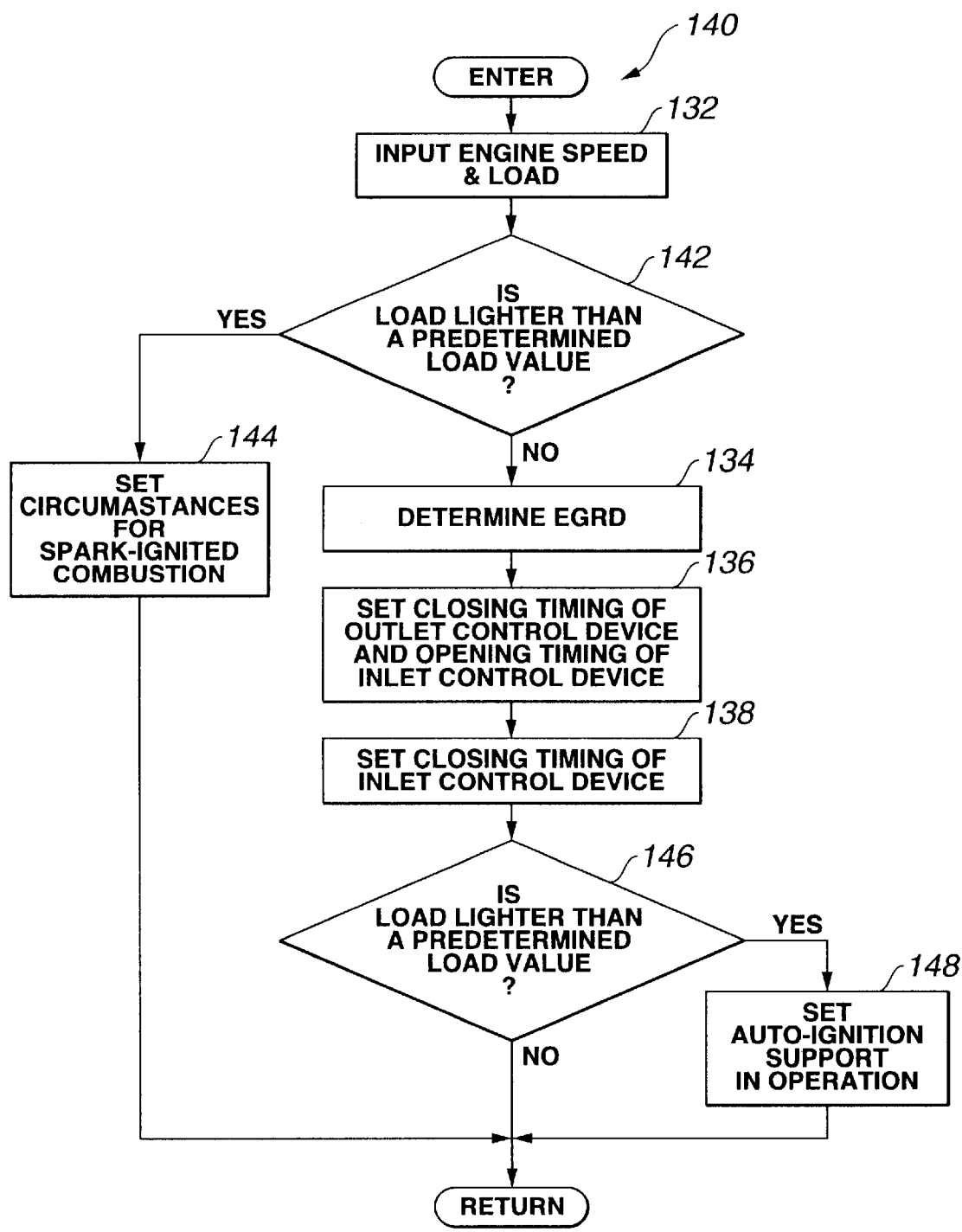
FIG. 12 is a flowchart of a control routine for operating another exemplary implementation of the present invention.

With reference to FIG. 12, a flowchart 140 illustrates control logic for controlling an auto-ignition in engine 12 to implement a control strategy, according to which the auto-ignition support is set in operation when the engine load is lighter or lower than one predetermined engine load value, and then the circumstances are set for spark-ignited combustion when the engine load is lighter or lower than another predetermined engine load value. For ease of comparison of this flowchart 140 to the previously described flowchart 130 shown in FIG. 10, like reference numerals are used to designate like or similar blocks. Comparing FIG. 12 with FIG. 10 reveals that flowchart 140 is substantially the same as flowchart 130 except the provision of an enquiry block 142 followed by a block 144 and another enquiry block 146 followed by a block 148. Enquiry block 142, which is positioned between blocks 132 and 134, represents comparison of engine load Lr to a predetermined load value. Particularly, it is determined whether or not the engine load Lr is lighter or lower than the predetermined value thereby to determine whether or not a predetermined load condition for spark-ignited combustion is matched. This predetermined load condition may be set taking into account, for example, whether spark-ignited combustion is used to cover where the auto-ignition support could not cover or it is used to cover where the auto-ignition could cover. In this example, the predetermined load value is lower than $Lr_2$ (see FIG. 5B). If the predetermined load condition specified at block 142 is matched, the routine goes to block 144. At block 144, microprocessor 42 requires the valve controller and spark controller to set circumstances for spark-ignited combustion. Thereafter, microprocessor 42 exits out of the routine.

If the predetermined load condition specified at block 142 is not matched, the logic goes to blocks 134, 136 and 138. Microprocessor 42 performs the same operations at these blocks 134, 136 and 138 as operations at their counterparts in FIG. 10. After block 138, the routine goes to enquiry block 146. Enquiry block 146 represents comparison of engine load Lr to another or second predetermined load value that is higher than the first mentioned predetermine load value. Particularly, it is determined whether or not the engine load Lr is lighter or lower than this second predetermined value thereby to determine whether or not a predetermined load condition for auto-ignition support is matched. The second predetermined load value is higher or greater than the first predetermined load value. In this example, the second predetermined load value is set equal to $Lr_2$ (see FIG. 5B). If the predetermined load condition specified at block 146 is matched, the routine goes to block 148. At block 148, microprocessor 42 sets auto-ignition support in operation by requiring the spark controller to produce spark via spark plug 26 (see FIG. 2) or requiring the ozone controller to generate ozone via ozone generator 139 (see FIG. 11).

If the predetermined load condition specified at block 146 is not matched, microprocessor 42 exits out of the routine. After block 148, microprocessor 42 exits out of the routine.

In the previously described control strategies including those indicated by flowcharts 130 and 140, the ignitability of auto-ignition has not been monitored. In further embodiment according to the present invention, a control strategy accounts for the ignitability level. According to this control strategy, the ignitability of auto-ignition is monitored based on the evaluation of level of engine stability, and the EGRD, which has been determined based on engine speed and load using the EGRD map shown in FIG. 7, is temporarily increased with a correction amount when the ignitability is degraded. Correction amount $\Delta x$ increases with the decreasing loads. In particular, the determined EGRD is increased by the correction amount $\Delta x$ to reinstate the ignitability thereby to bring the engine stability into a predetermined range about a desired level of engine stability. The correction amount $\Delta x$ in EGRD increases with the decreasing engine loads because a gain in cylinder temperature against a unit increase in EGRD decreases with the decreasing engine loads.

Figure 13:
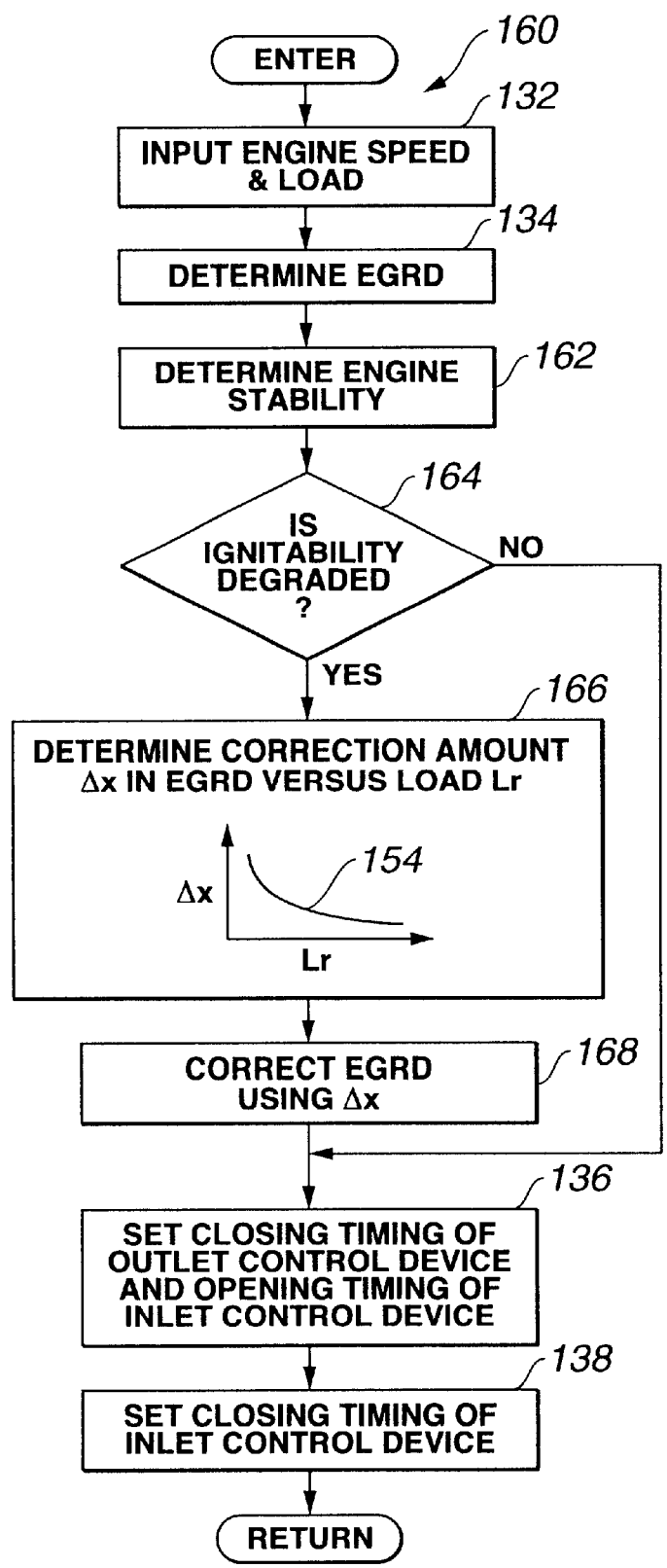
FIG. 13 is a flowchart of a control routine for operating further exemplary embodiment of the present invention.

With reference now to FIG. 13, a flowchart 160 illustrates control logic for controlling an auto-ignition in engine 12 accounting for the ignitability of auto-ignition. For ease of comparison of this flowchart 160 to the previously described flowchart 130 shown in FIG. 10, like reference numerals are used to designate like or similar blocks. Comparing FIG. 13 to FIG. 10 reveals that flowchart 160 is substantially the same as flowchart 130 except the provision of blocks 162, 164, 166 and 168 between the blocks 134 and 136.

Block 162 represents determination of engine stability. In this example, in determining engine stability, microprocessor 42 inputs a cylinder pressure signal 152 from a cylinder pressure sensor 150, evaluates cyclic variation of the cylinder pressure to determine a current level of engine stability. As shown in FIG. 2 or 11, such cylinder pressure sensor 150 is provided in the conventional manner to monitor in-cylinder pressure within cylinder 14. Enquiry block 164 represents determination of whether or not the ignitability of auto-ignition is degraded. In determining whether or not the ignitability is degraded, microprocessor 42 establishes a predetermined range about a desired level of engine stability, and compares the determined current level of engine stability to the established predetermined range. If the determined current engine stability fails to match the predetermined range and requires elevation of cylinder temperature to reinstate the ignitability thereby to bring the stability level back into the predetermined range, microprocessor 42 determines that the ignitability of auto-ignition is degraded. If this is the case, the routine goes to blocks 166 and 168 from block 164. If, at block 164, it is determined the ignitability of auto-ignition is not degraded, the routine passes these blocks 166 and 168.

Block 166 represents determination of correction amount $\Delta x$ in EGRD versus engine load Lr. The illustrated line 154 within the block 166 shows the correction amount $\Delta x$ in EGRD versus engine load Lr. The correction amount $\Delta x$ in EGRD increases with the decreasing engine loads because a gain in cylinder temperature against a unit increase in EGRD decreases with the decreasing engine loads. The characteristic as indicated by the illustrated line 154 is stored in the form of a look-up map. At block 166, microprocessor 42 looks in the stored look-up map using the engine load Lr that has been determined at block 132 to find or determine correction amount $\Delta x$.

At the next block 168, microprocessor 42 corrects EGRD that has been determined at block 134 using the determined correction amount $\Delta x$ by increasing the EGRD by $\Delta x$.

The routine goes from block 168 to blocks 136 and 138 to set closing timing of outlet control device 20 and opening timing of inlet control device 16, and to set closing timing of inlet control device 16.

From the previous description along with flowchart 160 shown in FIG. 13, it will be appreciated that the correction amount $\Delta x$, which is utilized to temporarily increase EGRD, increases with the decreasing engine loads thereby to rapidly reinstate the ignitability of auto-ignition over varying engine loads. If desired, during engine operating range of different engine loads lower than a predetermined engine load value, such increasing of EGRD by the correction amount $\Delta x$ may be terminated and circumstances for spark-ignited combustion is set when a predetermined load condition is matched. This predetermined load condition includes engine-operating range of different engine loads that are lighter or lower than the predetermined engine load value. This is described below.

Figure 14:
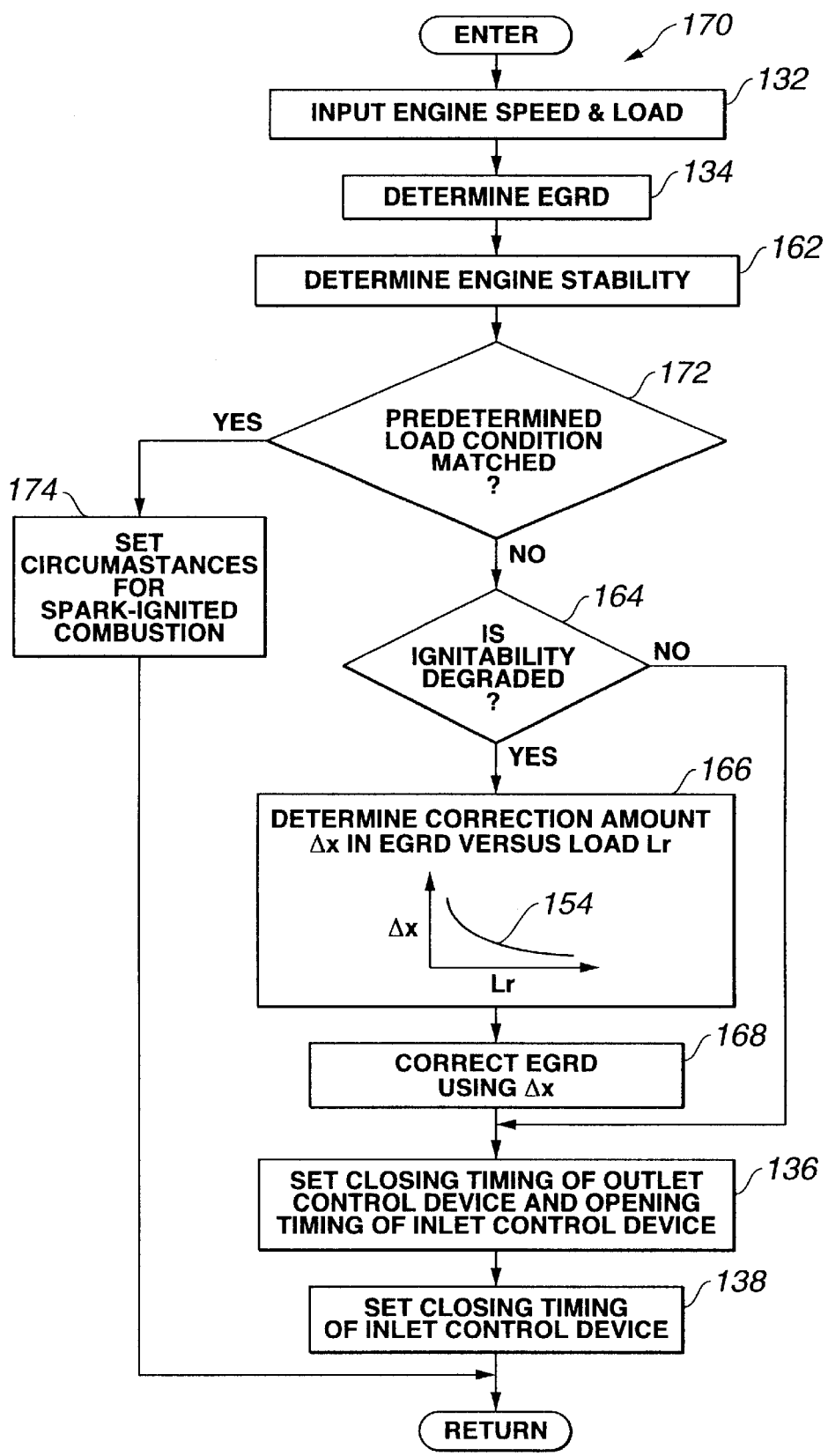
FIG. 14 is a flowchart of a control routine for operating other exemplary embodiment of the present invention.

With reference to FIG. 14, a flowchart 170 illustrates control logic for controlling an auto-ignition accounting for the above-mentioned control strategy. For ease of comparison of this flowchart 170 to the previously described flowchart 160 shown in FIG. 13, like reference numerals are used to designate like or similar blocks. Comparing FIG. 14 to FIG. 13 reveals that flowchart 170 is substantially the same as flowchart 160 except the provision of enquiry block 172 followed by block 174. Enquiry block 172, which is positioned between blocks 162 and 164, represents determination on whether or not the predetermined engine load condition is matched. In this 30 routine, at block 172, microprocessor 42 compares engine load Lr determined at block 132 to a predetermined engine load value and determines that the predetermined engine load condition is matched if the engine load Lr is lighter or lower than the predetermined engine load value. If, at block 172, the predetermined engine load condition is not matched, the routine goes to block 164. If the predetermined engine load condition is matched, the routine goes to block 174. At block 174, microprocessor 42 requires the valve controller and spark controller to set circumstances for spark-ignited combustion. Thereafter, microprocessor 42 exits out of the routine.

With continuing reference to FIG. 14, enquiry block 172 precedes enquiry block 164 so that, upon determination that the predetermined load condition is matched, the circumstances for spark-ignited combustion are set irrespective of whether or not the ignitability has been degraded. If desired, enquiry block 172 may be positioned between enquiry block 164 and correction amount determination block 166. In this case, since enquiry block 164 precedes enquiry block 172, the circumstances for spark-ignited combustion are set upon determination that the predetermined load condition is matched when the ignitability of auto-ignition is degraded.

Figure 15:
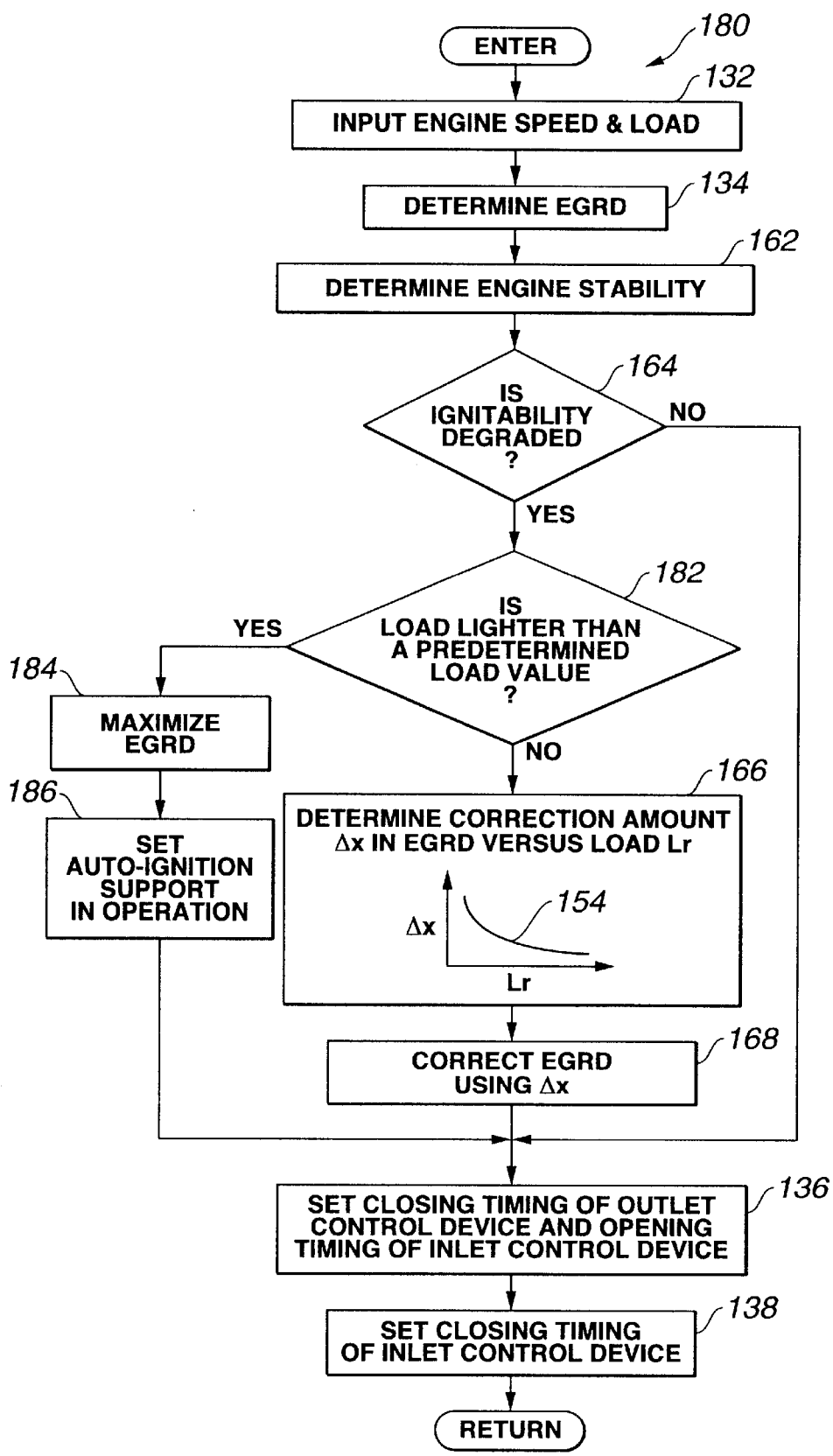
FIG. 15 is a flowchart of a control routine for operating still other exemplary embodiment of the present invention.

With reference now to FIG. 15, a flowchart 180 illustrates control logic for controlling an auto-ignition to implement control strategy of utilizing auto-ignition support upon determination that the engine load is lighter or lower than a predetermined load value when the ignitability of auto-ignition is degraded. For ease of comparison of this flowchart 180 to the previously described flowchart 160 shown in FIG. 13, like reference numerals are used to designate like or similar blocks. Comparing FIG. 15 to FIG. 13 reveals that flowchart 180 is substantially the same as flowchart 160 except the provision of enquiry block 182 followed by blocks 184 and 186. Enquiry block 182, which is positioned between blocks 164 and 166, represents determination on whether or not the engine load is lighter than a predetermined engine load value. If, at block 182, the engine load is not lighter than the predetermined engine load value, the routine goes to block 166. If the engine load is lighter than the predetermined engine load value, the routine goes to block 184. At block 184, microprocessor 42 maximizes the EGRD. At the next block 186, microprocessor 42 sets auto-ignition support in operation by requiring the spark controller to produce spark via spark plug 26 (see FIG. 2) or requiring the ozone controller to generate ozone via ozone generator 139 (see FIG. 11). Next, the routine goes to blocks 136 and 138. Block 136 represents setting closing timing of outlet control device 20 and opening timing of inlet control device 16 to accomplish the EGRD that has been determined at block 186 or block 168. Block 138 represents setting closing timing of inlet control device 16.

While the present invention has been particularly described, in conjunction with exemplary embodiments, it is evident that many alternatives, modifications and variations will be apparent to those skilled in the art in light of the foregoing description It is therefore contemplated that the appended claims will embrace any such alternatives, modifications and variations as falling within the true scope and spirit of the present invention.

This application claims the priority of Japanese Patent Applications No. P2001-191130, filed Jun. 25, 2001, the disclosure of which is hereby incorporated by reference in its entirety.

What is claimed is:

1. A method for controlling an auto-ignition in an internal combustion engine including a cylinder with an inlet control device and an outlet control device, comprising:

setting the closing timing of the outlet control device increasingly before a top dead center (TDC) during the exhaust stroke of each engine cycle with decreasing engine loads at the rate of a change in the closing timing per a unit change in the decreasing engine loads, which change in the closing timing increases with the decreasing engine loads; and setting the opening timing of the inlet control device after the TDC.

2. The method as claimed in claim 1, further comprising:

determining whether or not the ignitability of auto-ignition is degraded;

determining a correction amount; and increasing the closing timing of the outlet control device before the TDC further by the determined correction amount upon determination that the ignitability is degraded.

3. The method as claimed in claim 2, wherein the step of determining a correction amount includes:

increasing the correction amount with the decreasing engine loads.

4. The method as claimed in claim 3, wherein the step of setting the opening timing of the inlet control device includes:

increasing the opening timing of the inlet control device after the TDC with the decreasing engine loads.

5. The method as claimed in claim 2, further comprising:

providing an auto-ignition support when engine load is lighter than a predetermined load value.

6. The method as claimed in claim 5, wherein the step of providing an auto-ignition support includes:

at least one of:
    increasing a compression ratio;
    producing a spark; and
    producing ozone.

7. The method as claimed in claim 1, further comprising:

setting circumstances for spark-ignited combustion when engine load is lighter than a predetermined load value.

8. The method as claimed in claim 2, further comprising:

setting circumstances for spark-ignited combustion when engine load is lighter than a predetermined load value.

9. The method as claimed in claim 1, further comprising:

decreasing a compression ratio during engine operating range of different engine speeds, including an engine idle speed, lower than a predetermined engine speed, wherein the step of decreasing a compression ratio includes:
    setting the closing timing of the inlet control device increasingly after a bottom dead center (BDC) during the induction stroke of each engine cycle with the decreasing engine speeds.

10. The method as claimed in claim 1, further comprising:

decreasing a compression ratio during engine operating range of different engine speeds, including an engine idle speed, lower than a predetermined engine speed, wherein the step of decreasing a compression ratio includes:
    throttling intake airflow to the inlet control device.

11. The method as claimed in claim 9, further comprising:
setting the closing timing of the outlet control device increasingly before the TDC with the decreasing engine speeds during engine operating range of different engine speeds, including the engine idle speed, lower than a second predetermined engine speed that is lower than the first mentioned predetermined engine speed.

12. The method as claimed in claim 1, further comprising:
setting the closing timing of the outlet control device increasingly before the TDC with the increasing engine speeds during engine operating range of different engine speeds higher than a predetermined engine speed.

13. The method as claimed in claim 1, wherein the step of setting the opening timing of the inlet control device after the TDC includes:
keeping the closing timing of the outlet control device and the opening timing of the inlet control device equiangularly separated before and after the TDC, respectively.

14. A system for controlling an auto-ignition in an internal combustion engine, comprising:
a cylinder with an inlet control device and an outlet control device; and
a valve controller,
the valve controller being operative to set the closing timing of the outlet control device increasingly before a top dead center (TDC) during the exhaust stroke of each engine cycle with decreasing engine loads at the rate of a change in the closing timing per a unit change in the decreasing engine loads, which change in the closing timing increases with the decreasing engine loads,
the valve controller being operative to set the opening timing of the inlet control device after the TDC.

15. An internal combustion engine, comprising:
a cylinder with an inlet control device and an outlet control device;
means for setting the closing timing of the outlet control device increasingly before a top dead center (TDC) during the exhaust stroke of each engine cycle with decreasing engine loads at the rate of a change in the closing timing per a unit change in the decreasing engine loads, which change in the closing timing increases with the decreasing engine loads; and
means for setting the opening timing of the inlet control device after the TDC.

16. A computer readable storage media having stored therein data representing instructions executable by a computer to control an auto-ignition in an internal combustion engine including a cylinder with an inlet control device and an outlet control device, comprising:
instructions for setting the closing timing of the outlet control device increasingly before a top dead center (TDC) during the exhaust stroke of each engine cycle with decreasing engine loads at the rate of a change in the closing timing per a unit change in the decreasing engine loads, which change in the closing timing increases with the decreasing engine loads; and
instructions for setting the opening timing of the inlet control device after the TDC.

* * * * *